(12) United States Patent
Bhatia et al.

(10) Patent No.: US 8,141,138 B2
(45) Date of Patent: Mar. 20, 2012

(54) AUDITING CORRELATED EVENTS USING A SECURE WEB SINGLE SIGN-ON LOGIN

(75) Inventors: Gaurav Bhatia, Foster City, CA (US); Andrew Maywah, Mountain View, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1068 days.

(21) Appl. No.: 11/252,531

(22) Filed: Oct. 17, 2005

(65) Prior Publication Data

US 2007/0101440 A1    May 3, 2007

(51) Int. Cl.
    *H04L 29/06*    (2006.01)
(52) U.S. Cl. .............................. 726/8; 726/28
(58) Field of Classification Search .................. 713/165, 713/167, 178; 726/28, 2–5, 8
    See application file for complete search history.

(56) References Cited

U.S. PATENT DOCUMENTS

| | | | | |
|---|---|---|---|---|
| 6,170,005 | B1 * | 1/2001 | Meandzija ..................... | 709/217 |
| 7,221,935 | B2 * | 5/2007 | Barriga-Caceres et al. ......................... | 455/414.1 |
| 7,228,304 | B1 * | 6/2007 | Wong et al. ..................... | 707/10 |
| 7,296,290 | B2 * | 11/2007 | Barriga et al. ..................... | 726/8 |
| 7,506,070 | B2 * | 3/2009 | Tran et al. ..................... | 709/246 |
| 7,600,027 | B2 * | 10/2009 | Yan ............................... | 709/227 |
| 7,802,295 | B2 * | 9/2010 | Murase et al. .................. | 726/10 |
| 7,861,289 | B2 * | 12/2010 | Meyer et al. ..................... | 726/12 |
| 7,865,943 | B2 * | 1/2011 | Hayler et al. ..................... | 726/6 |
| 7,908,380 | B1 * | 3/2011 | Chu et al. ....................... | 709/227 |
| 8,051,168 | B1 * | 11/2011 | Boysko et al. ................. | 709/225 |
| 2001/0007133 | A1 * | 7/2001 | Moriconi et al. ............. | 713/201 |
| 2002/0046281 | A1 * | 4/2002 | Cope .............................. | 709/227 |
| 2002/0069172 | A1 * | 6/2002 | Omshehe et al. .............. | 705/51 |
| 2003/0163733 | A1 * | 8/2003 | Barriga-Caceres et al. .. | 713/201 |

(Continued)

FOREIGN PATENT DOCUMENTS

WO    WO 2005069823 A2 *    8/2005

OTHER PUBLICATIONS

The PHP Group. "PHP Manual: session_regenerate_id." Oct. 10, 2004. Available at http://web.archive.org/web/20041010170310/http://www.php.net/manual/en/function.session-regenerate-id.php. Downloaded Jul. 28, 2009.*

(Continued)

*Primary Examiner* — David García Cervetti
(74) *Attorney, Agent, or Firm* — Kilpatrick Townsend & Stockton LLP (57) ABSTRACT

Systems, methods, and machine-readable media are disclosed to provide for auditing of events or access of resources in a distributed system. In one embodiment, auditing access of resources can comprise receiving from a client a request to access one or more of the resources. A sign-on identifier can be assigned to a user of the client requesting to access the resources. The user identifier and sign-on identifier can be provided to one or more applications managing the one or more resources requested by the client. The resources requested by the client can be accessed based on the request. A record of the access of the resources requested by the client can be logged in a repository. Based on these records and information relating to prohibited activity, a determination can be made as to whether a prohibited activity is being performed by one or more users.

31 Claims, 7 Drawing Sheets

U.S. PATENT DOCUMENTS

| | | | |
|---|---|---|---|
| 2003/0191989 A1* | 10/2003 | O'Sullivan | 714/47 |
| 2004/0006710 A1* | 1/2004 | Pollutro et al. | 713/201 |
| 2004/0054935 A1* | 3/2004 | Holvey et al. | 713/202 |
| 2005/0015513 A1* | 1/2005 | Tran et al. | 709/246 |
| 2005/0154887 A1* | 7/2005 | Birk et al. | 713/168 |
| 2005/0154913 A1* | 7/2005 | Barriga et al. | 713/201 |
| 2006/0095569 A1* | 5/2006 | O'Sullivan | 709/224 |
| 2006/0095570 A1* | 5/2006 | O'Sullivan | 709/224 |
| 2006/0156379 A1* | 7/2006 | Vissapragada | 726/1 |
| 2006/0218629 A1* | 9/2006 | Pearson et al. | 726/8 |
| 2007/0044146 A1* | 2/2007 | Murase et al. | 726/10 |
| 2007/0073519 A1* | 3/2007 | Long | 702/185 |
| 2007/0117548 A1* | 5/2007 | Fernandez-Alonso et al. | 455/414.1 |

OTHER PUBLICATIONS

The PHP Group. "PHP Manual: session_id." Jul. 16, 2005. http://web.archive.org/web/20050716051903/http://us2.php.net/manual/en/function.session-id.php. Downloaded Jul. 28, 2009.*

* cited by examiner

FIG. 7 ve # AUDITING CORRELATED EVENTS USING A SECURE WEB SINGLE SIGN-ON LOGIN

BACKGROUND OF THE INVENTION

The present invention relates generally to the field of distributed computer systems and more particularly to auditing of correlated events within the distributed system.

Distributed computer systems, such as various types of computer networks, enable different users to access applications and/or content specific to their uses and, in some cases, limit the user's access based on the user's authority or permission. For example, web based applications provide users access to a variety of resources. Many of these applications have access control restrictions and/or enforce security policies to prevent unauthorized actions. That is, a web based application may impose restrictions to prevent users from performing actions or accessing content for which that user is not authorized.

In a typical distributed environment, many different servers may be used and each server may include any number of applications, each application proving access to and managing a variety of resources. In such a distributed environment, these applications and servers are not integrated in the sense that they do not share information regarding user activities. These application may share information and access to resources but otherwise do not track which users are performing what kind of actions with which resources. That is, other than the resources that a particular application manages, it is unaware of what a user may be doing or attempting to do with other resources managed by other applications, that may be on different servers.

This can make distributed systems vulnerable to different types of attacks by hackers, crackers, and other assorted miscreants with ill intentions or nothing better to do. More specifically, since the applications and servers of a distributed system are loosely integrated or not integrated at all, such systems can be vulnerable to distributed types of attacks that seek to exploit the fact that the application managing the various resources are largely unaware of each other. For example, a distributed attack may attempt to gain unauthorized access to one system, then another or may attempt to access multiple systems simultaneously.

Additionally, unintentional unauthorized use of resources may go unnoticed. That is, due to some flaw in the management processes of one application or system, a user may unintentionally gain access to a resource for which he is not authorized or for which he does not have permission to access. While not malicious, such unauthorized access can still present problems.

Unauthorized access of resources, whether intentional or unintentional, are difficult to detect and prevent or correct in a distributed system. Attempts to detect and correct such unauthorized access of resources in a distributed system involve monitoring user and application logs for the various servers in the system. However, since such logs are maintained individually by the servers and applications, such a method would involve first collecting the logs from the individual systems and then analyzing them. Since the systems are independent, there is no way to correlate events or even users between the systems. While events may be correlated based on a timestamp associated with each log entry, there is no way of assuring that the clocks of the individual systems are synchronized. Therefore, not only are such methods very inefficient and can be highly labor intensive, they are frequently ineffective and cannot be performed in real time because of the difficulty in correlating the events from the different logs.

Hence, there is a need for methods and systems that allow for auditing of events in a distributed system.

BRIEF SUMMARY OF THE INVENTION

Systems, methods, and machine-readable media are disclosed to provide for auditing of events or access of resources in a distributed system. In one embodiment, a method of auditing access of one or more resources by a client can comprise receiving from the client a request to access one or more of the resources. A sign-on identifier can be assigned to a user of the client requesting to access one or more of the resources. The sign-on identifier can be associated with a user identifier for the user of the client. The user identifier and sign-on identifier can be provided to one or more applications managing the one or more resources requested by the client. In some cases, providing the user identifier and session identifier to the one or more applications managing the one or more resources can comprise generating a redirection request, the redirection request including the session identifier and an indication of a location of the resource and sending the redirection request to the client. According to one embodiment, the one or more resources requested by the client can be accessed based on the request. In some cases, accessing the one or more resources requested by the client can further comprise determining whether the user of the client is authorized to access the one or more resources requested by the client in a manner requested based on the user identifier and the session identifier.

According to another embodiment, a record of the access of the one or more resources requested by the client can be logged in a repository. The record can include the user identifier and the session identifier. In other cases, the record can further include a timestamp indicating a time said accessing the one or more resources is performed, an indication of a type of access requested to be performed on the one or more resources by the client, an indication of the one or more resources requested by the client, and/or an indication of a result of said accessing of the one or more resources requested by the client.

According to yet another embodiment, assigning the session identifier to the user of the client can comprise determining whether a session identifier has already been assigned to the user of the client. In response to determined a session identifier has already been assigned to the user of the client, a previous session identifier associated with the user identifier for the user of the client can be invalidated and a new session identifier can be assigned to the user.

According to still another embodiment, the method can further comprise reading one or more records of accessing of the one or more resources. Based on the one or more records and information relating to prohibited activity, a determination can be made as to whether a prohibited activity is being performed by one or more users. In response to determining that a prohibited activity is being performed by one or more users, corrective action can be taken.

According to another embodiment, a method of providing access to one or more resources can comprise receiving a request to access one or more of the resources. In some cases, receiving a request to access one or more of the resources can comprise receiving a redirection request. The request can include a user identifier and a session identifier. A determination can be made, based on the user identifier and session identifier, whether the requested access is authorized. Results of the determination can be recorded. The results can include the user identifier and the session identifier. In some cases, the results can further include a timestamp indicating a time said accessing the one or more resources is performed, an indication of a type of access requested to be performed on the one or more resources by the client, an indication of the one or more resources requested by the client, and/or an indication of a result of said accessing of the one or more resources requested by the client.

According to yet another embodiment, a method of auditing user access of resources can comprise reading one or more records of said accessing of the one or more resources. A determination can be made, based on the one or more records and information relating to prohibited activity, whether a prohibited activity is being performed by one or more users. In response to determining that a prohibited activity is being performed by one or more users, corrective action can be taken. The method can further include determining whether the activity is a current activity and, in response to the activity being a current activity, blocking further actions by the user and/or making an alarm indicating the prohibited activity. Blocking further actions by the user can comprise invalidating the session identifier.

According to still another embodiment, a system can comprise a repository, a client, and a single sign-on server communicatively coupled with the client. The single sign-on server can be adapted to receive from the client a request to access one or more resources and assign a sign-on identifier to a user of the client requesting to access one or more of the resources. The sign-on identifier can be associated with a user identifier for the user of the client.

The single sign-on server can provide the user identifier and sign-on identifier to one or more applications managing the one or more resources requested by the client. In some cases, the single sign-on server can be adapted to provide the user identifier and session identifier to the one or more applications managing the one or more resources by generating a redirection request, the redirection request including the session identifier and an indication of a location of the resource and send the redirection request to the client. The system can also include one or more servers communicatively coupled with the client and adapted to execute the one or more applications managing the one or more resources and access the one or more resources requested by the client based on the request. The one or more servers can be further adapted to determine whether the user of the client is authorized to access the one or more resources requested by the client in a manner requested based on the user identifier and the session identifier. The servers can also log a record of the accessing of the one or more resources requested by the client in a repository. The record can include the user identifier and the session identifier. The record can further include a timestamp indicating a time said accessing the one or more resources is performed, an indication of a type of access requested to be performed on the one or more resources by the client, an indication of the one or more resources requested by the client, and/or an indication of a result of said accessing of the one or more resources requested by the client.

In some cases, the system can further comprise an auditor system adapted to read one or more records of the accessing of the one or more resources from the repository. The auditor system can determine, based on the one or more records and information relating to prohibited activity, whether a prohibited activity is being performed by one or more users. In response to determining that a prohibited activity is being performed by one or more users, the auditor system can take corrective action.

According to another embodiment, the system can further comprise a sign-on repository communicatively coupled with the single sign-on server. The single sign-on server can be further adapted to record the session identifier and the user identifier in the sign-on repository. In some cases, the single sign-on server can be further adapted to determine, based on contents of the sign-on repository, whether a session identifier has already been assigned to the user of the client. In response to determined a session identifier has already been assigned to the user of the client, a previous session identifier associated with the user identifier for the user of the client can be invalidated and a new session identifier can be assigned to the user.

DETAILED DESCRIPTION OF THE INVENTION

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

Embodiments of the present invention provide methods, system and machine-readable media for auditing of events or access of resources in a distributed system. As will be described in detail below, auditing access of one or more resources by a client can comprise receiving from the client a request to access one or more of the resources. After successful authentication, a sign-on identifier can be assigned to a user of the client requesting to access one or more of the resources. The sign-on identifier can be associated with a user identifier for the user of the client. The user identifier and sign-on identifier can be provided to one or more applications managing the one or more resources requested by the client. In some cases, providing the user identifier and session identifier to the one or more applications managing the one or more resources can comprise generating a redirection request, the redirection request including the session identifier and an indication of a location of the resource and sending the redirection request to the client. According to one embodiment, the one or more resources requested by the client can be accessed based on the request.

A record of the access of the one or more resources requested by the client can be logged in a repository. The record can include the user identifier and the session identifier. In other cases, the record can further include a timestamp indicating a time said accessing the one or more resources is performed, an indication of a type of access requested to be performed on the one or more resources by the client, an indication of the one or more resources requested by the client, and/or an indication of a result of said accessing of the one or more resources requested by the client. Based on the one or more records and information relating to prohibited activity, a determination can be made as to whether a prohibited activity is being performed by one or more users. In response to determining that a prohibited activity is being performed by one or more users, corrective action can be taken.

Figure 1:
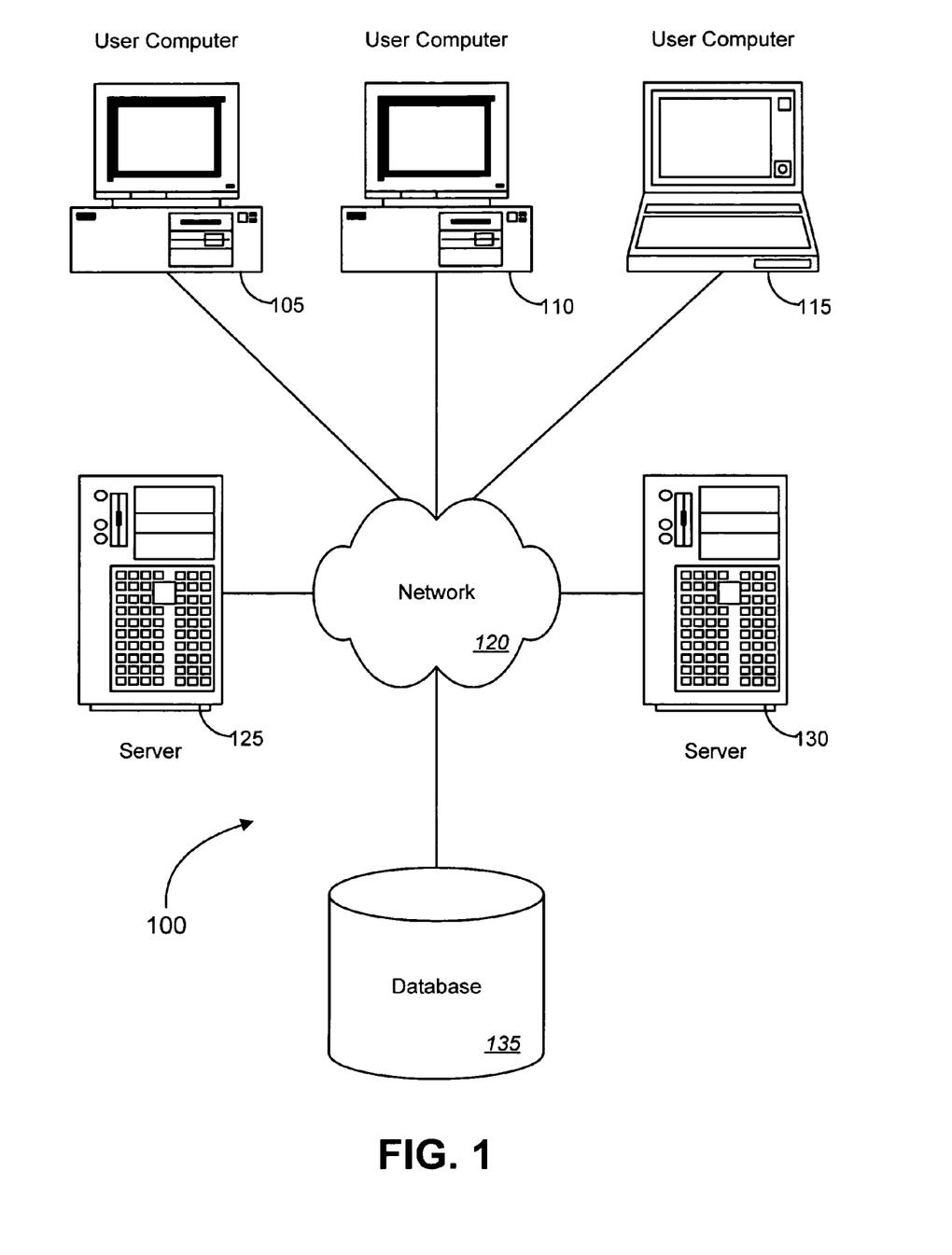
FIG. 1 is a block diagram illustrating components of an exemplary operating environment in which various embodiments of the present invention may be implemented.

FIG. 1 is a block diagram illustrating components of an exemplary operating environment in which various embodiments of the present invention may be implemented. The system 100 includes one or more user computers 105, 110, and 115. The user computers 105, 110, and 115 may be general purpose personal computers (including, merely by way of example, personal computers and/or laptop computers running various versions of Microsoft Corp.'s Windows and/or Apple Corp.'s Macintosh operating systems) and/or workstation computers running any of a variety of commercially-available UNIX or UNIX-like operating systems. These user computers 105, 110, 115 may also have any of a variety of applications, including for example, database client and/or server applications, and web browser applications. Alternatively, the user computers 105, 110, and 115 may be any other electronic device, such as a thin-client computer, Internet-enabled mobile telephone, and/or personal digital assistant, capable of communicating via a network (e.g., the network 120 described below) and/or displaying and navigating web pages or other types of electronic documents. Although the exemplary system 100 is shown with three user computers, any number of user computers may be supported.

System 100 further includes a network 120. The network 120 may can be any type of network familiar to those skilled in the art that can support data communications using any of a variety of commercially-available protocols, including without limitation TC P/IP, SNA, IPX, AppleTalk, and the like. Merely by way of example, the network 120 maybe a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks. Furthermore, network communications between the various components of the system 100 can be made over a secure communications channel via the use, for example, of various types of encryption software including, but not limited to, Secure Socket Layer (SSL) or any other appropriate method.

The system may also include one or more server computers 125, 130. One server may be a web server 125, which may be used to process requests for web pages or other electronic documents from user computers 105, 110, and 120. The web server can be running an operating system including any of those discussed above, as well as any commercially-available server operating systems. The web server 125 can also run a variety of server applications, including HTTP servers, FTP servers, CGI servers, database servers, Java servers, and the like. In some instances, the web server 125 may publish operations available operations as one or more web services.

The system 100 may also include one or more file and or/application servers 130, which can, in addition to an operating system, include one or more applications accessible by a client running on one or more of the user computers 105, 110, 115. The server(s) 130 may be one or more general purpose computers capable of executing programs or scripts in response to the user computers 105, 110 and 115. As one example, the server may execute one or more web applications. The web application may be implemented as one or more scripts or programs written in any programming language, such as Java™, C, C# or C++, and/or any scripting language, such as Perl, Python, or TCL, as well as combinations of any programming/scripting languages. The application server(s) 130 may also include database servers, including without limitation those commercially available from Oracle, Microsoft, Sybase™, IBM™ and the like, which can process requests from database clients running on a user computer 105.

In some embodiments, an application server 130 may create web pages dynamically. The web pages created by the web application server 130 may be forwarded to a user computer 105 via a web server 125. Similarly, the web server 125 may be able to receive web page requests, web services invocations, and/or input data from a user computer 105 and can forward the web page requests and/or input data to the web application server 130.

In further embodiments, the server 130 may function as a file server. Although for ease of description, FIG. 1 illustrates a separate web server 125 and file/application server 130, those skilled in the art will recognize that the functions described with respect to servers 125, 130 may be performed by a single server and/or a plurality of specialized servers, depending on implementation-specific needs and parameters.

According to one embodiment of the present invention, one of the servers 125 can function as a single sign-on server 125 providing sign-on services to clients while the other server 130 can function as an application and or file server providing access to one or more resources such as a file, webpage, device, service, etc. That is, as will be discussed in detail below, the single sign-on server 125 can be adapted to receive from a user computer 110 a request to access one or more resources and assign a sign-on identifier to a user of the client 110 requesting to access one or more of the resources. The sign-on identifier can be associated with a user identifier for the user of the user computer 110.

The single sign-on server 125 can provide the user identifier and sign-on identifier to one or more applications running on another server 130 and managing the one or more resources requested by the user computer 110. In some cases, the single sign-on server 125 can be adapted to provide the user identifier and session identifier to the one or more applications managing the one or more resources by generating a redirection request, the redirection request including the session identifier and an indication of a location of the resource and send the redirection request to the user computer 110. The applications can be further adapted to determine whether the user of the user computer 110 is authorized to access the one or more resources requested by the user computer 110 in a manner requested based on the user identifier and the session identifier.

The system 100 may also include a database 135. The database 135 may reside in a variety of locations. By way of example, database 135 may reside on a storage medium local to (and/or resident in) one or more of the computers 105, 110, 115, 125, 130. Alternatively, it may be remote from any or all of the computers 105, 110, 115, 125, 130, and in communication (e.g., via the network 120) with one or more of these. In a particular set of embodiments, the database 135 may reside in a storage-area network ("SAN") familiar to those skilled in the art. Similarly, any necessary files for performing the functions attributed to the computers 105, 110, 115, 125, 130 may be stored locally on the respective computer and/or remotely, as appropriate. In one set of embodiments, the database 135 may be a relational database, such as Oracle 10i, that is adapted to store, update, and retrieve data in response to SQL-formatted commands.

According to one embodiment of the present invention and as will be described in detail below, the database 135 can function as a repository for records of resource access by users of the user computers 105-115. As used herein, the term "repository" can be used to refer to any type of data store including, but not limited to, a relational database, a Lightweight Directory Access Protocol (LDAP) directory, file, etc. The servers 125 and 130 can log a record of access of the one or more resources requested by the user computers 105-115 in the database 135. The record can include the user identifier and the session identifier. The record can further include a timestamp indicating a time said accessing the one or more resources is performed, an indication of a type of access requested to be performed on the one or more resources by the client, an indication of the one or more resources requested by the client, and/or an indication of a result of said accessing of the one or more resources requested by the client. Based on the one or more records and information relating to prohibited activity, a determination can be made as to whether a prohibited activity is being performed by one or more users.

Figure 2:
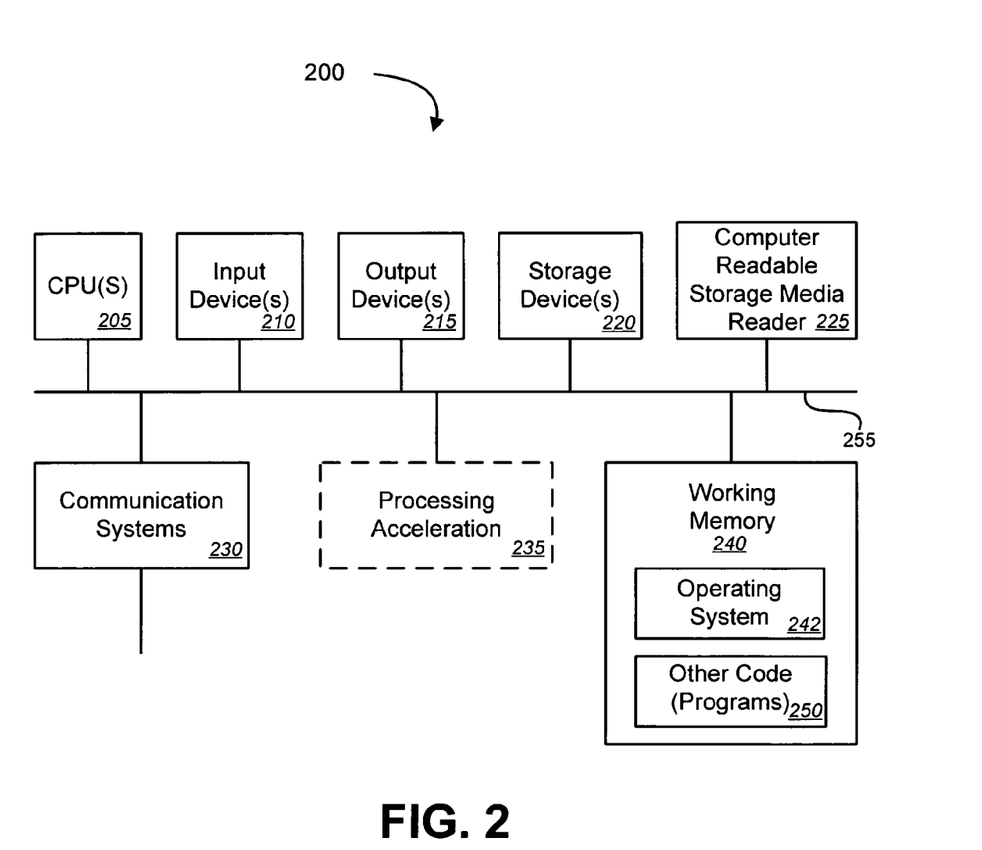
FIG. 2 is a block diagram illustrating an exemplary computer system in which embodiments of the present invention may be implemented.

FIG. 2 is a block diagram illustrating an exemplary computer system in which embodiments of the present invention may be implemented. This example illustrates a computer system 200 such as may be used, in whole, in part, or with various modifications, to provide a client computer or server such as those discussed above.

The computer system 200 is shown comprising hardware elements that may be electrically coupled via a bus 255. The hardware elements may include one or more central processing units (CPUs) 205, one or more input devices 210 (e.g., a mouse, a keyboard, etc.), and one or more output devices 215 (e.g., a display device, a printer, etc.). The computer system 200 may also include one or more storage device 220. By way of example, storage device(s) 220 may be disk drives, optical storage devices, solid-state storage device such as a random access memory ("RAM") and/or a read-only memory ("ROM"), which can be programmable, flash-updateable and/or the like.

The computer system 200 may additionally include a computer-readable storage media reader 225, a communications system 230 (e.g., a modem, a network card (wireless or wired), an infra-red communication device, etc.), and working memory 240, which may include RAM and ROM devices as described above. In some embodiments, the computer system 200 may also include a processing acceleration unit 235, which can include a DSP, a special-purpose processor and/or the like.

The computer-readable storage media reader 225 can further be connected to a computer-readable storage medium, together (and, optionally, in combination with storage device (s) 220) comprehensively representing remote, local, fixed, and/or removable storage devices plus storage media for temporarily and/or more permanently containing computer-readable information. The communications system 230 may permit data to be exchanged with the network 220 and/or any other computer described above with respect to the system 200.

The computer system 200 may also comprise software elements, shown as being currently located within a working memory 240, including an operating system 245 and/or other code 250. It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed.

Software of computer system 200 may include code 250 for implementing methods for auditing of events or access of resources in a distributed system as described herein. Generally speaking, a method of auditing access of one or more resources by a client can comprise receiving from the client a request to access one or more of the resources. After successful authentication, a sign-on identifier can be assigned to a user of the client requesting to access one or more of the resources. The sign-on identifier can be associated with a user identifier for the user of the client. The user identifier and sign-on identifier can be provided to one or more applications managing the one or more resources requested by the client. In some cases, providing the user identifier and session identifier to the one or more applications managing the one or more resources can comprise generating a redirection request, the redirection request including the session identifier and an indication of a location of the resource and sending the redirection request to the client. According to one embodiment, the one or more resources requested by the client can be accessed based on the request.

A record of the access of the one or more resources requested by the client can be logged in a repository. The record can include the user identifier and the session identifier. In other cases, the record can further include a timestamp indicating a time said accessing the one or more resources is performed, an indication of a type of access requested to be performed on the one or more resources by the client, an indication of the one or more resources requested by the client, and/or an indication of a result of said accessing of the one or more resources requested by the client. Based on the one or more records and information relating to prohibited activity, a determination can be made as to whether a prohibited activity is being performed by one or more users. In response to determining that a prohibited activity is being performed by one or more users, corrective action can be taken. Additional details of such methods will be discussed below with reference to FIGS. 4-7.

Figure 3:
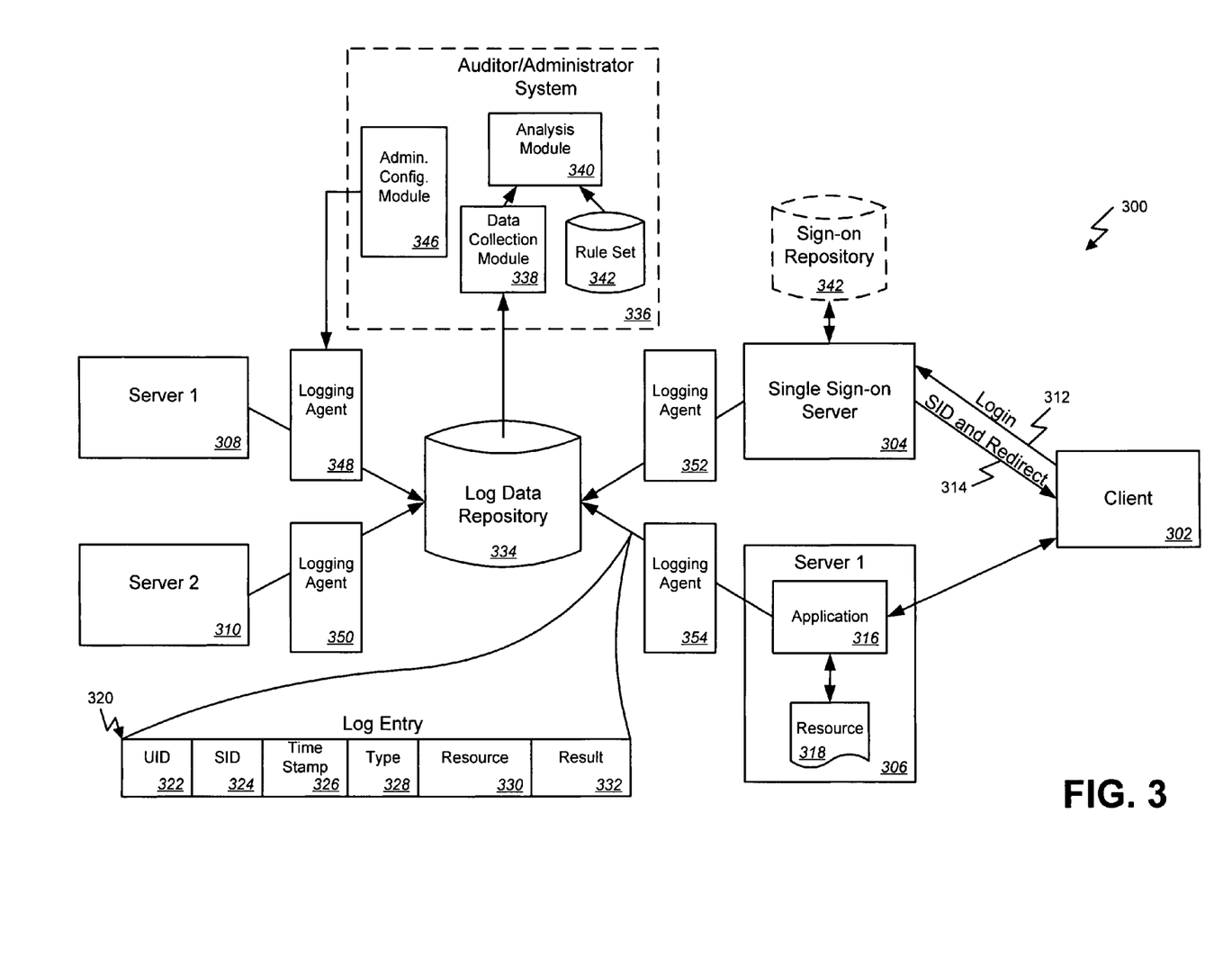
FIG. 3 is a block diagram illustrating the functional components of an exemplary system using a single sign on server and repository of client activity information according to one embodiment of the present invention.

FIG. 3 is a block diagram illustrating the functional components of an exemplary system using a single sign-on server and repository of client activity information according to one embodiment of the present invention. In this example, a client system 302 such as user computers 105, 110, or 115 described above, can be communicatively coupled with a server 306, such as servers 125 or 130 described above, and a single sign-on server 304. Client 302 may be communicatively coupled with server 306 and single sign-on server 304 via any of a number of possible communication media, also as described above. Furthermore, network communications between the various components of the system 300 can be made over a secure communications channel via the use, for example, of various types of encryption software including, but not limited to, Secure Socket Layer (SSL) or any other appropriate method.

The single sign-on server 304 can be adapted to receive from the client 302 a login or access request 312 to access one or more resources 318 located on or managed by one or more of the servers 306-310. According to one embodiment of the present invention, the single sign-on server can first authenticate the identity of the user of the client via any of a variety of methods including, but not limited to, a username/password check, Kerberos token, Radius token, Secure Socket Layer (SSL) based challenge, etc. The single sign-on server 304, after successfully authenticating the user, can assign a sign-on identifier to the user of the client 302 requesting to access one or more of the resources 318. The sign-on identifier can be associated with a user identifier for the user of the client 302. The single sign-on server 304 can then provide the user identifier and sign-on identifier to one or more applications 316 managing the one or more resources 318 requested by the client 302. According to one embodiment of the present invention, the single sign-on server can provide the user identifier and session identifier to the one or more applications 316 by generating a redirection request. The redirection request can include the session identifier and an indication of a location of the resource and sending the redirection request 314 to the client 302.

That is, the single sign-on server can maintain or have access to a map or other information indicating the current location of resources of the system. Based on this information, the single sign-on server 304 can determine the appropriate server 306 to which to redirect the client 302. The single sign-on server can generate a redirection request indicating the location, for example in the form of a Uniform Resource Locator (URL), of the server as well as the session identifier. This redirection request 314 can be sent to the client 302 causing the client 302 to be redirected to the appropriate application 316 on the appropriate server 306.

One or more servers 306-308 can be communicatively coupled with the client 302. Each server 306-310 can be adapted to execute one or more applications 316, the applications 316 managing one or more resources 318. The resources 318 can be any of a variety of possible resources that can be provided by the server 306. For example, resource 318 can be a file, a device, a service, an applet or application, etc. The application 316 provides access to the resource(s) 318 requested by the client 302. The resource 318 requested can be determined by the redirection 314 provided to the client 302 by the single sign-on server 304. That is, the URL or other indication of the location of the resource 318 provided by the single sign-on server 304 to the client 302 not only directs the client 302 to the proper server 306 and/or application 316 but also indicates to the application 316 which resource 318 is requested. Furthermore, this redirection 314 also indicates to the application 316 that the user of the client 302 is authorized to access the requested resource 318.

That is, since the redirection request 314 is only generated by the single sign-on server 304 for a user that is authorized to access a requested resource 318 and the single sign-on server 304 is trusted by the application 316, the application 316 can assume that the user is properly authorized to access the requested resource 318. Alternatively or additionally, the application 316 can be further adapted to determine whether the user of the client 302 is authorized to access the one or more resources 318 requested by the client 302 in a manner requested. This determination can, in some cases, be based on the user identifier and the session identifier. That is, the application may perform an additional verification or authorization of the user which may include a check of the validity of the session identifier assigned to the client and/or the user identifier.

In addition to providing access to the requested resource 318, the application 316 can also be adapted to log a record 320 of the access. That is, a record 320 of a user's access of a resource can be recorded in log data repository 334. As used herein, the term "repository" can be used to refer to any type of data store including, but not limited to, a relational database, a Lightweight Directory Access Protocol (LDAP) directory, file, etc. The record 320 can include the user identifier (UID) 322 and the session identifier (SID) 324. Additionally, the record can include a timestamp 326 indicating a time the access was performed or attempted, an indication of a type 328 of access requested, an indication such as a URL of the one or more resources 330 requested by the client, and an indication of a result 332 of the access such as success or failure. According to one embodiment of the present invention, the single sign-on server 304 can also generate and record records of various events, such as a user login. Such records 320 from the applications 316 of the servers 306-310 and/or the single sign-on server 304 can be recorded in the log data repository 334 by each application for each access or attempted access of each resource. The records can be used for troubleshooting or maintenance of the system as well as detecting unauthorized or suspicious activity since they provide a way, through the UID 322 and SID 324, to correlate the actions of various users of different servers while accessing different resources.

According to one embodiment of the present invention, the applications 316 of the various servers 306-310 and/or the single sign-on server 304 can log event data to logging agents 348-352. The logging agents 348-352 can comprise one or more server programs adapted to intercept the events from each server 304-310 and insert the event records into the log data repository 334. As shown here, there can be one logging agent 348-354 for each server 304-310. Alternatively, a different number of logging agents may be used. For example, one logging agent may be used to record events from all, or some subset of all, servers 304-310. Additionally, as shown here, the logging agents 348-354 are separate from the servers 304-310. However, the logging agents 348-354 may be stored on and executed by the servers 304-310 or another processor depending upon the exact implementation.

To aid in performing such correlation and monitoring, the system 300 may optionally include an auditor or administrator system 336. The auditor system can include data collection module 338 that can be adapted to read one or more records from the log data repository 334 and analysis module 340 that can be adapted to correlated related records based on the UID and SID and determine whether a prohibited activity is being performed by one or more users. That is, based on the one or more records and information relating to prohibited activity such as rules, heuristics, etc. that may be stored in rule set 342, suspicious, unauthorized, or prohibited actions by one or more users can be detected. Such checks can be performed periodically in a batch process or may be performed in real time on an ongoing basis.

According to one embodiment of the present invention, the auditor or administrator system 336 can also include an administration configuration module 346. Administration configuration module 346 can be used to configure event logging performed by each server 304-310 and/or logging agent 348-354. For example, the administration configuration module 346 can send configuration updates to one or more logging agents 348 over a secure communications channel. The administration configuration module 346 can configure the format of the logs, the type of events to be logged, when the events should be logged, etc. Note that while administration configuration module 346 is shown here, for the sake of clarity, communicating with one logging agent 348, the administration configuration module 346 may be communicatively coupled with all, or some subset of all, logging agents 348-354 and/or servers 304-310.

According to one embodiment of the present invention, in response to determining that a prohibited activity is being performed by one or more users, the auditor system can take corrective action. This action can include making an alarm on a console or display, paging a technician, recording the events for later review, automatically prohibiting further action by the user performing the suspicious or prohibited action, etc.

The system 300 may also include an optional sign-on repository 342 communicatively coupled with the single sign-on server 304. In such a case, the single sign-on server 304 can be adapted to record the session identifier and the user identifier of each user upon login. Furthermore, the single sign-on server 304 can be adapted to determine whether a session identifier has already been assigned to the user of the client 302. In response to determined a session identifier has already been assigned to the user of the client 302, the single sign-on server 304 can be adapted to invalidate a previous session identifier associated with the user identifier for the user of the client 302 and assign a new session identifier to the user. In this way, problems associated with multiple session can be avoided without hindering a user who inadvertently forgets to end a previous session.

Importantly, several variations of the system 300 as shown here can be made without departing from the scope of the present invention. For example, the log data repository 334, while shown as separate from any of the other components may in use be implemented as part of the single sign-on server 304, one or more of the servers 306-310, the auditor system 336, or may be distributed between multiple components. In another example, the functions of the auditor system, while optional, may be implemented by other components of the system 300 such as the single sign-on server or one or more of the servers 306-310. Other changes are also contemplated and considered to be within the scope of the present invention.

Figure 4:
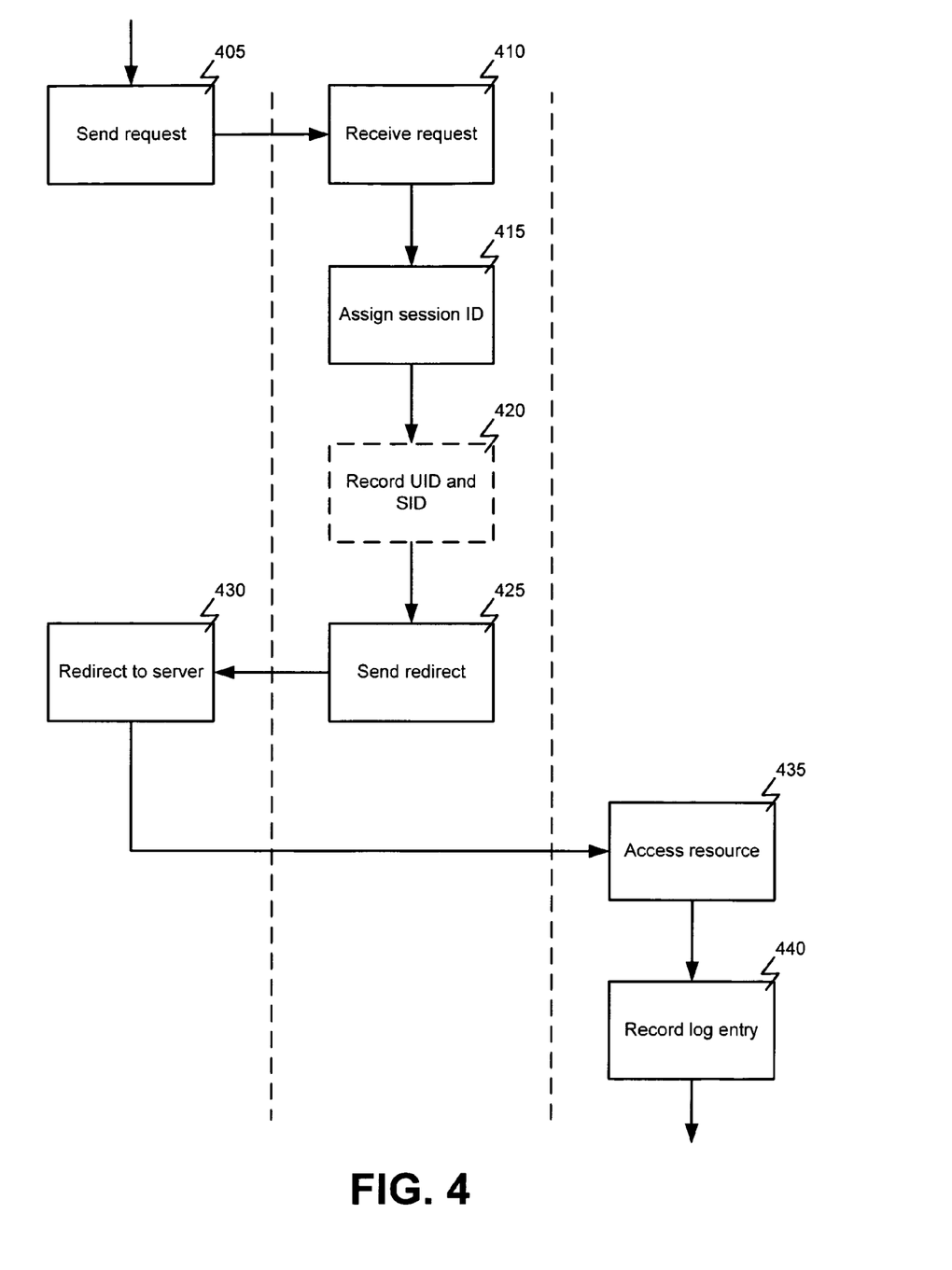
FIG. 4 is a flowchart illustrating, at a high level, a process for using a single sign on server according to one embodiment of the present invention.

FIG. 4 is a flowchart illustrating, at a high level, a process for using a single sign on server according to one embodiment of the present invention. In this example, the process begins when the user logs in to the client and requests a resource. The client in turn sends 405 a request for that resource to the single sign-on server.

The single sign-on server receives 410 the request to access one or more of the resources from the client. According to one embodiment of the present invention, the single sign-on server can first authenticate the identity of the user of the client via any of a variety of methods including, but not limited to, a username/password check, Kerberos token, Radius token, Secure Socket Layer (SSL) based challenge, etc. The single sign-on server can then, if the user is authenticated, assign 415 a sign-on identifier to a user of the client requesting to access one or more of the resources. As discussed above, the sign-on identifier can be associated with a user identifier for the user of the client. The single sign-on server can optionally record 420 the user identifier and the session identifier assigned to that user. The user identifier and sign-on identifier can be provided to one or more applications managing the one or more resources requested by the client. As discussed above, the user identifier and sign-on identifier can be provided to one or more applications by generating and sending 425 a redirection request including the session identifier and an indication of a location of the resource to the client.

The client can receive the redirection request and be redirected 430 to the location of the resource, i.e., the server and/or application, indicated in the redirection request from the single sign-on server. The server can then access 435 the resource specified in the redirection request and record 440 a record of the access in the repository.

This is a very high level view of one exemplary process. In practice, additional steps may be performed. For example, as will be discussed below, the single sign-on server may perform a authorization check of the user prior to assigning a session identifier or sending a redirection request to the client in order to control access based on permission.

Figure 5:
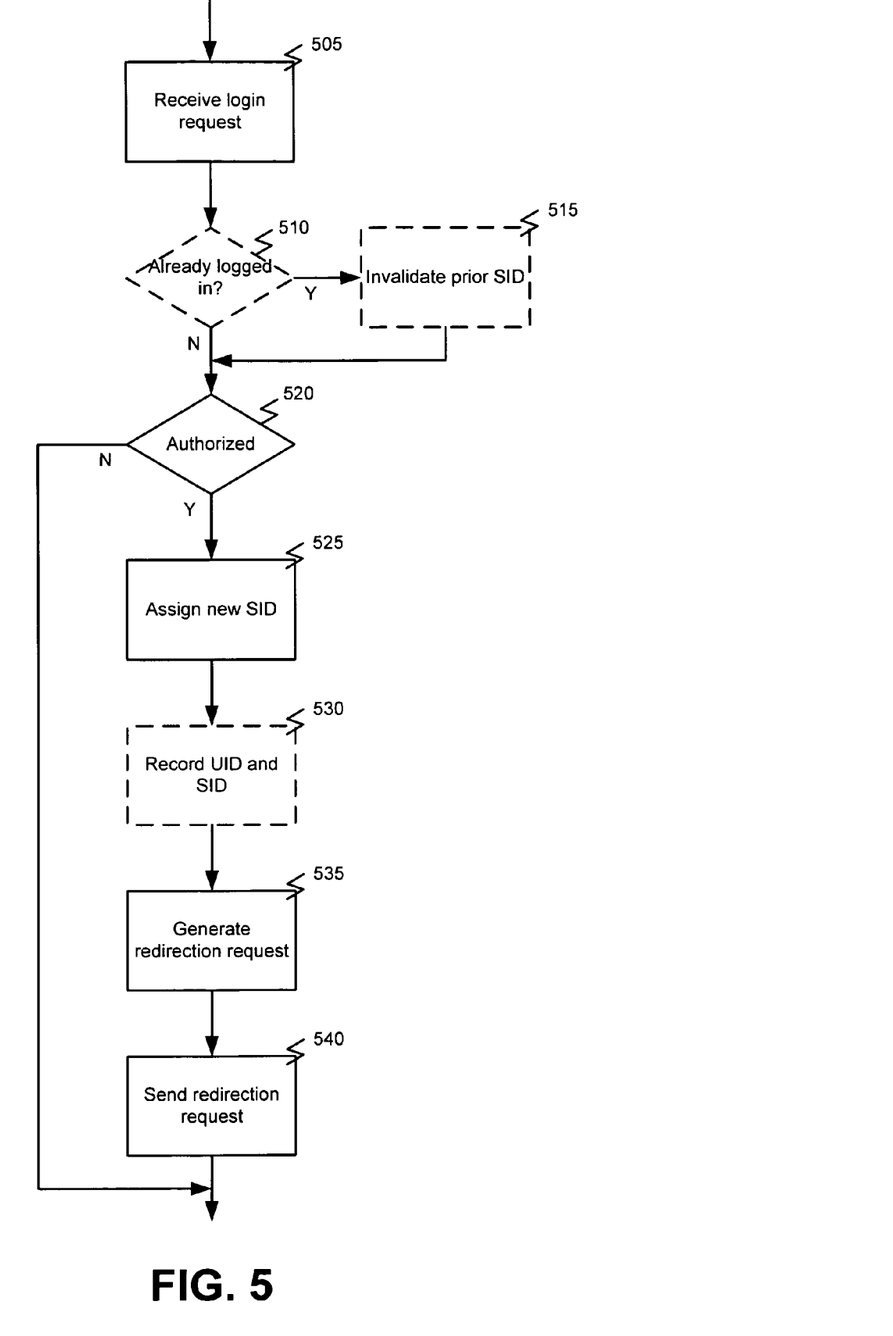
FIG. 5 is a flowchart illustrating additional details of single sign on server processing according to one embodiment of the present invention.

FIG. 5 is a flowchart illustrating additional details of single sign-on server processing according to one embodiment of the present invention. In this example, the process begins when the single sign-on server receives 505 from the client a request to access one or more of the resources. Optionally, a determination 510 can be made as to whether a session identifier has already been assigned to the user of the client. Responsive to determined a session identifier has already been assigned to the user of the client, the previous session identifier associated with the user identifier for the user of the client can be invalidated 515.

A determination 520 can be made as to whether the user of the client is authorized to access the requested resource in a manner requested, such as reading, writing, deleting, etc. This determination can be based on information relating to the permissions required for the various resources as stored in or accessible by the single sign-on server.

If 520 the user is authorized to perform the requested access, a sign-on identifier can be assigned 525 to the user of the client requesting to access one or more of the resources. Optionally, the user identifier and the session identifier can be recorded 530 by the single sign-on server. While optional, recording this information may be useful if the optional step of determining 510 whether a session identifier has already been assigned to the user of the client is performed on subsequent log ins.

Finally, a redirection request can be generated 535 indicating the session identifier and a location of the resource. As discussed above, the indication of the location of the resource ma be a URL or other indication and can be determined based on information maintained or accessible by the single sign-on server indicating the locations of the various resources available in the system. The redirection request can then be sent 540 to the client, causing the client to be redirected to the location of the resource indicated in the redirection request.

Figure 6:
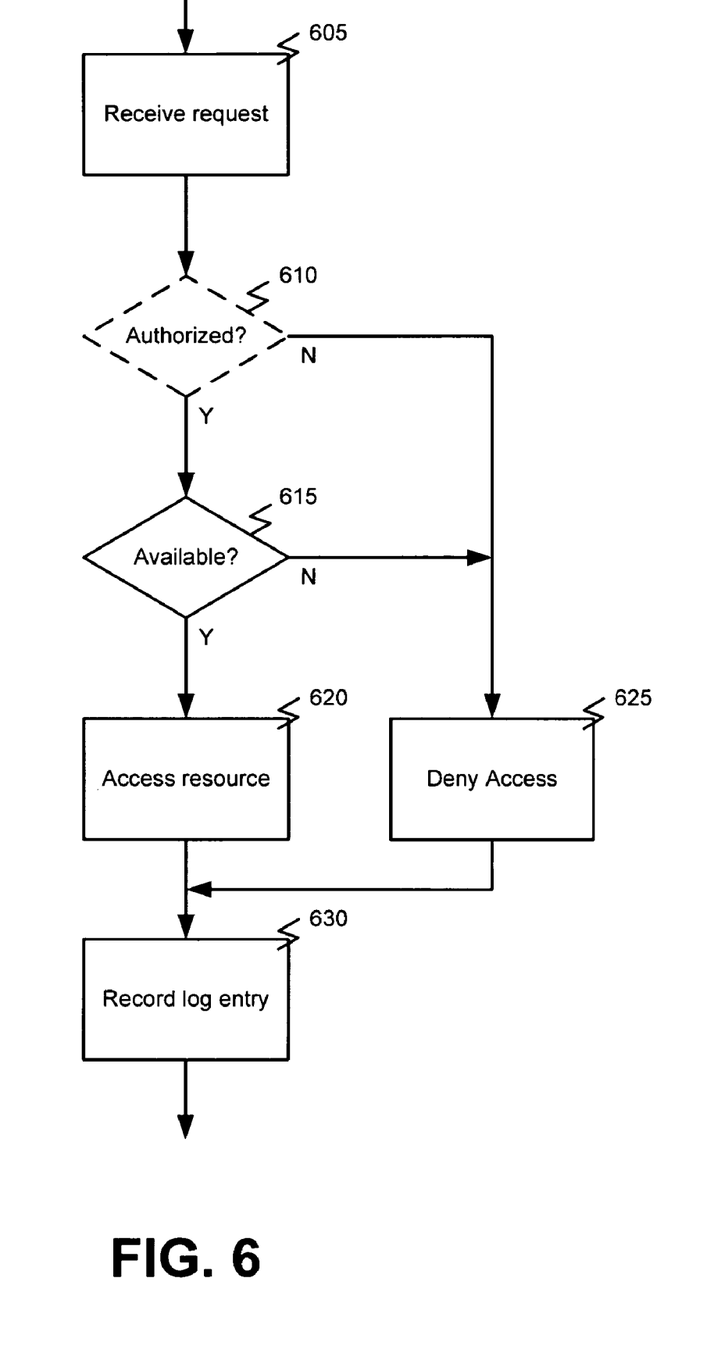
FIG. 6 is a flowchart illustrating additional details of server application processing according to one embodiment of the present invention.

FIG. 6 is a flowchart illustrating additional details of server application processing according to one embodiment of the present invention. This process begins when the application receives 605 a request to one or more resources from the client. As can be seen from the discussion thus far, the request can be in the form of the redirection from the single sign-on server and includes a user identifier and a session identifier.

The application can optionally determine 610 whether the requested access is authorized. This determination 610, if made, can be based on a number of criteria. For one, the determination can be implicit, and based on simply verifying that the redirection request is from the single sign-on server. That is, the single sign-on server, as discussed above, can perform authorization of the user and the requested access. If the single sign-on server is trusted by the application, determining 610 whether the user is authorized can comprise authenticating the request as a redirection from the single sign-on server. Alternatively, the application can perform any of a number of other verification, authorization, and/or authentication function to determine 610 whether the user is authorized to perform the requested access.

If 610 authorized, a determination 615 can be made as to whether the requested resource is available for access. If the access is not authorized 610 or the resource is not available 615, the access can be denied 625 or prohibited. If the access is authorized 610 and the resource is available 615, the access can be performed 620. Whether performed 620 or denied 625, the results of the access can be recorded 630 in the repository.

Figure 7:
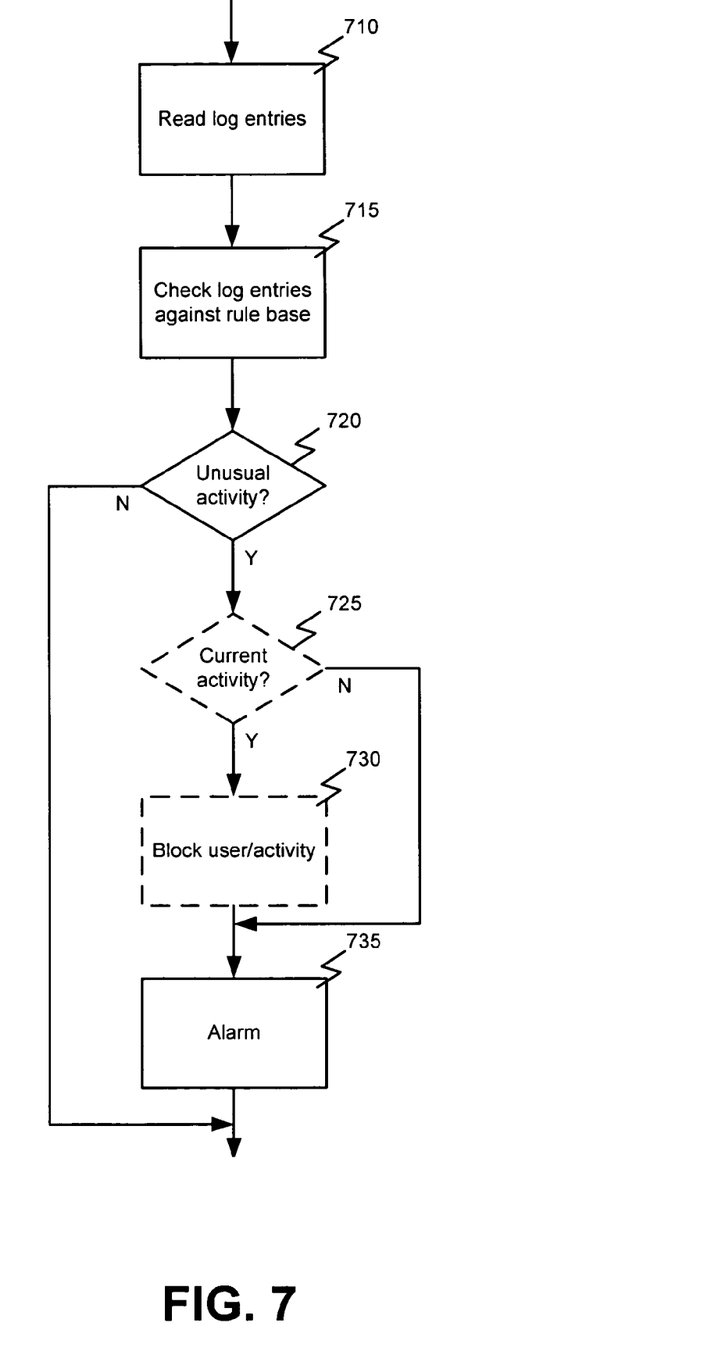
FIG. 7 is a flowchart illustrating additional details of administrator or auditor system processing according to one embodiment of the present invention.

FIG. 7 is a flowchart illustrating additional details of administrator or auditor system processing according to one embodiment of the present invention. In this example, the process begins when the auditor or administrator system reads one or more records of accessing of the one or more resources from the repository. As noted above, these records can include the user identifier, session identifier, and possibly other information including but not limited to a timestamp indicating a time the access was performed, a type of access requested such as read, write, modify, delete, etc., an indication of the one or more resources requested by the client such as one or more URLs, and/or an indication of a result of the access such as an indication of success or failure.

The records can be checked 715 against a rule base or other information relating to and/or describing prohibited activity. That is, a set of rules, heuristics, or other information can be stored by the auditor system that defines, describes or otherwise identifies actions or patterns of actions by users that relates to malicious or suspicious activity or may indicate that a user is simply experiencing trouble using the system of accessing a resource. Based on the one or more records and the information relating to prohibited or unusual activity, a determination 720 can be made as to whether a prohibited activity is being performed by one or more users.

If 720 a determination is made that a prohibited activity is being performed by one or more users, an optional determination can be made as to whether the activity is a current activity, i.e., whether the activity is being detected in real time. If the activity is a current activity, further actions by the user can be blocked 730. In some cases blocking further actions by the user can comprise invalidating the session identifier, logging the user off of the system and revoking privileges, etc.

Regardless of whether the optional determination 725 of whether a prohibited activity is current is made, if 720 unusual activity is detected, another action, such as issuing an alarm 735 can be taken. That is an alarm such as a message on a console or display, a text message to a technician, etc. can be made to inform a responsible party of the activity. Alternatively, corrective action may be taken automatically. For example, if it is determined that a particular resource is non-responsive, the resource may be rebooted, remounted, etc.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method for auditing access of one or more resources by a client, the method comprising:
    receiving at a single sign-on server from the client a request to access one or more of the resources;
    assigning with the single sign-on server a session identifier to a user of the client requesting to access one or more of the resources, the session identifier associated with a user identifier for the user of the client;
    recording the session identifier and user identifier with the single sign-on server in a sign-on repository maintained by the single sign-on server;
    providing the user identifier and session identifier to the client from the single sign-on server;
    redirecting the client from the single sign-on server to a server of a plurality of servers other than the single sign-on server;
    providing the user identifier and session identifier to one or more applications managing the one or more resources requested by the client, the one or more applications executed by the server other than the single sign-on server and wherein each of the plurality of servers further executes a logging agent and wherein each logging agent records in a central log data repository a record of each access of the one or more resources managed by the one or more applications of the server executing the logging agent, wherein the central log data repository is separate from the sign-on repository;
    accessing the one or more resources requested by the client with the one or more applications based on the request;
    logging a record of said accessing of the one or more resources requested by the client in the central log data repository with the logging agent of the server executing the one or more applications managing the one or more resources requested by the client, wherein the record includes the user identifier and the session identifier;
    reading with an auditor system a plurality of records of said accessing of the one or more resources from the central log repository;
    correlating with the auditor system two or more of the plurality of records of said accessing of the one or more resources based on the user identifier and session identifier of each of the plurality of records;
    determining with the auditor system, based on the correlated two or more records and a set of rules defining prohibited activity, whether a prohibited activity is being performed by a user with more than one active session, wherein the set of rules defining prohibited activity is maintained by the auditor system and defines patterns of actions related to malicious activity and wherein determining whether a prohibited activity is being performed comprises comparing the correlated two or more records to the set of rules.

2. The method of claim 1, wherein assigning the session identifier to the user of the client further comprises:

determining based on the session identifier and user identifier recorded in the sign-on repository whether a session identifier has already been assigned to the user of the client; and responsive to determining a session identifier has already been assigned to the user of the client, invalidating a previous session identifier associated with the user identifier for the user of the client and assigning a new session identifier to the user.

3. The method of claim 2, wherein accessing the one or more resources requested by the client further comprises determining whether the user of the client is authorized to access the one or more resources requested by the client in a manner requested based on the user identifier and validity of the session identifier.

4. The method of claim 2, wherein providing the user identifier and session identifier to the one or more applications managing the one or more resources comprises:

generating a redirection request with the single sign-on server, the redirection request including the session identifier and an indication of a location of the resource; and sending the redirection request from the single sign-on server to the client.

5. The method of claim 1, wherein each record further includes a timestamp indicating a time said accessing the one or more resources is performed.

6. The method of claim 5, wherein each record further includes an indication of a type of access requested to be performed on the one or more resources by the client.

7. The method of claim 6, wherein each record further includes an indication of the one or more resources requested by the client.

8. The method of claim 7, wherein each record further includes an indication of a result of said accessing of the one or more resources requested by the client.

9. The method of claim 8, further comprising:

responsive to determining that a prohibited activity is being performed, taking corrective action with the auditor system.

10. The method of claim 1, further comprising authenticating the user of the client prior to assigning the sign-on identifier to the user of the client.

11. A system comprising:

a central log data repository;

a sign-on repository separate from the central log data repository;

a client;

a single sign-on server communicatively coupled with the client and the sign-on repository and adapted to receive from the client a request to access one or more resources, assign a session identifier to a user of the client requesting to access one or more of the resources, the session identifier associated with a user identifier for the user of the client, record the session identifier and the user identifier in the sign-on repository, and provide the user identifier and session identifier to one or more applications managing the one or more resources requested by the client;

a plurality of servers communicatively coupled with the client and the central log data repository and wherein each of the plurality of servers executes a logging agent and one or more applications managing one or more resources, wherein each logging agent records in the central log data repository accesses of the one or more resources managed by the one or more applications of the server executing the logging agent, and wherein the one or more applications of at least one server of the plurality of servers access the one or more resources requested by the client based on the request and the logging agent of the at least one server logs a record of each access of the one or more resources in the central log data repository, each record including the user identifier and the session identifier; and an auditor system communicatively coupled with the central log data repository and each of the logging agents and adapted to read a plurality of records of said accessing of the one or more resources from the central log data repository, correlate two or more of the plurality of records of said access of the one or more resources, determine, based on the correlated two or more records and a set of rules defining prohibited activity, whether a prohibited activity is being performed by a user with more than one active session, wherein the set of rules defining prohibited activity is maintained by the auditor system and defines patterns of actions related to malicious activity and wherein determining whether a prohibited activity is being performed comprises comparing the correlated two or more records to the set of rules.

12. The system of claim 11, wherein the one or more applications further determine whether the user of the client is authorized to access the one or more resources requested by the client in a manner requested based on the user identifier and the session identifier.

13. The system of claim 11, wherein the auditor system responsive to determining that a prohibited activity is being performed, is further adapted to take corrective action.

14. The system of claim 13, wherein the auditor system is further adapted to configure each of the logging agents.

15. The system of claim 14, wherein configuring each of the logging agents comprises configuring a format of the record and an event to be logged.

16. The system of claim 11, wherein the single sign-on server is further adapted to determine, based on contents of the sign-on repository, whether a session identifier has already been assigned to the user of the client, and responsive to determining a session identifier has already been assigned to the user of the client, invalidate a previous session identifier associated with the user identifier for the user of the client and assigning a new session identifier to the user.

17. The system of claim 11, wherein the single sign-on server is further adapted to provide the user identifier and session identifier to the one or more applications managing the one or more resources by generating a redirection request, the redirection request including the session identifier and an indication of a location of the resource and send the redirection request to the client.

18. The system of claim 11, wherein each record further includes a timestamp indicating a time said accessing the one or more resources is performed.

19. The system of claim 11, wherein each record further includes an indication of a type of access requested to be performed on the one or more resources by the client.

20. The system of claim 11, wherein each record further includes an indication of the one or more resources requested by the client.

21. The system of claim 11, wherein each record further includes an indication of a result of said accessing of the one or more resources requested by the client.

22. A machine-readable memory device having stored thereon a series of instructions which, when executed by a processor, cause the processor to audit access of one or more resources by a client by:

receiving at a single sign-on server from the client a request to access one or more of the resources;

assigning with the single sign-on server a session identifier to a user of the client requesting to access one or more of the resources, the session identifier associated with a user identifier for the user of the client;

recording the session identifier and user identifier with the single sign-on server in a sign-on repository maintained by the single sign-on server;

providing the user identifier and session identifier to the client from the single sign-on server;

redirecting the client from the single sign-on server to a server of a plurality of servers other than the single sign-on server;

providing the user identifier and session identifier to one or more applications managing the one or more resources requested by the client, the one or more applications executed by the server other than the single sign-on server and wherein each of the plurality of servers further executes a logging agent and wherein each logging agent records in a central log data repository a record of each access of the one or more resources managed by the one or more applications of the server executing the logging agent, wherein the central log data repository is separate from the sign-on repository;

accessing the one or more resources requested by the client with the one or more applications based on the request;

logging a record of said accessing of the one or more resources requested by the client in the central log data repository with the logging agent of the server executing the one or more applications managing the one or more resources requested by the client, wherein the record includes the user identifier and the session identifier;

reading with an auditor system a plurality of records of said accessing of the one or more resources from the central log repository;

correlating with the auditor system two or more of the plurality of records of said accessing of the one or more resources based on the user identifier and session identifier of each of the plurality of records;

determining with the auditor system, based on the correlated two or more records and a set of rules defining prohibited activity, whether a prohibited activity is being performed by a user with more than one active session, wherein the set of rules defining prohibited activity is maintained by the auditor system and defines patterns of actions related to malicious activity and wherein determining whether a prohibited activity is being performed comprises comparing the correlated two or more records to the set of rules.

23. The machine-readable memory device of claim 22, wherein accessing the one or more resources requested by the client further comprises determining whether the user of the client is authorized to access the one or more resources requested by the client in a manner requested based on the user identifier and validity of the session identifier.

24. The machine-readable memory device of claim 22, wherein assigning the session identifier to the user of the client further comprises:
determining based on the session identifier and user identifier recorded in the sign-on repository whether a session identifier has already been assigned to the user of the client; and
responsive to determining a session identifier has already been assigned to the user of the client, invalidating a previous session identifier associated with the user identifier for the user of the client and assigning a new session identifier to the user.

25. The machine-readable memory device of claim 24, wherein providing the user identifier and session identifier to the one or more applications managing the one or more resources comprises:
generating a redirection request with the single sign-on server, the redirection request including the session identifier and an indication of a location of the resource; and
sending the redirection request from the single sign-on server to the client.

26. The machine-readable memory device of claim 22, wherein each record further includes a timestamp indicating a time said accessing the one or more resources is performed.

27. The machine-readable memory device of claim 26, wherein each record further includes an indication of a type of access requested to be performed on the one or more resources by the client.

28. The machine-readable memory device of claim 27, wherein each record further includes an indication of the one or more resources requested by the client.

29. The machine-readable memory device of claim 28, wherein each record further includes an indication of a result of said accessing of the one or more resources requested by the client.

30. The machine-readable memory device of claim 29, further comprising:
responsive to determining that a prohibited activity is being performed, taking corrective action with the auditor system.

31. The machine-readable memory device of claim 22, further comprising authenticating the user of the client prior to assigning the sign-on identifier to the user of the client.

* * * * *

UNITED STATES PATENT AND TRADEMARK OFFICE
CERTIFICATE OF CORRECTION

| | | |
|---|---|---|
| PATENT NO. | : 8,141,138 B2 | Page 1 of 1 |
| APPLICATION NO. | : 11/252531 | |
| DATED | : March 20, 2012 | |
| INVENTOR(S) | : Bhatia et al. | |

It is certified that error appears in the above-identified patent and that said Letters Patent is hereby corrected as shown below:

In column 3, line 55, delete "an" and insert -- An --, therefor.

In column 5, line 45, delete "TC P/IP," and insert -- TCP/IP, --, therefor.

In column 6, line 41, delete "and or" and insert -- and/or --, therefor.

In column 12, line 45, delete "ma" and insert -- may --, therefor.

Signed and Sealed this
Twenty-ninth Day of May, 2012

David J. Kappos
*Director of the United States Patent and Trademark Office*